US008605324B2

(12) United States Patent
Katoh

(10) Patent No.: US 8,605,324 B2
(45) Date of Patent: Dec. 10, 2013

(54) IMAGE PROCESSING SYSTEM, IMAGE PROCESSING METHOD, AND COMPUTER READABLE RECORDING MEDIUM STORING PROGRAM THEREOF

(75) Inventor: Takeaki Katoh, Shizuoka-ken (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 357 days.

(21) Appl. No.: 13/039,528

(22) Filed: Mar. 3, 2011

(65) Prior Publication Data

US 2011/0216371 A1 Sep. 8, 2011

Related U.S. Application Data

(60) Provisional application No. 61/310,943, filed on Mar. 5, 2010.

(51) Int. Cl.
*G06K 15/00* (2006.01)
*G06K 15/02* (2006.01)
*H04N 1/387* (2006.01)

(52) U.S. Cl.
CPC .............. *G06K 15/02* (2013.01); *H04N 1/3875* (2013.01)
USPC ............................ 358/1.18; 358/450; 358/2.1

(58) Field of Classification Search
USPC .......... 358/2.1, 474, 530, 448, 443, 452, 450, 358/1.18
See application file for complete search history.

(56) References Cited

U.S. PATENT DOCUMENTS

| | | | |
|---|---|---|---|
| 5,751,924 A | 5/1998 | Hamada et al. | |
| 6,678,069 B1 | 1/2004 | Abe | |
| 7,634,739 B2 * | 12/2009 | McCrossan et al. | 715/810 |
| 2009/0048939 A1 * | 2/2009 | Williams | 705/26 |
| 2009/0254856 A1 * | 10/2009 | Cwajbaum | 715/808 |
| 2009/0295750 A1 * | 12/2009 | Yamazaki et al. | 345/173 |

(Continued)

FOREIGN PATENT DOCUMENTS

| JP | 11-291568 | 10/1999 |
|---|---|---|
| JP | 2001-138595 | 5/2001 |

*Primary Examiner* — Jerome Grant, II
(74) *Attorney, Agent, or Firm* — Turocy & Watson, LLP

(57) ABSTRACT

There is provided an image forming device capable of performing overlay printing in which a desired image overlaps with a desired page. An image processing system includes a display control unit that displays a setting screen which enables at least one overlay image overlapping with a page to be selected from a plurality of predetermined overlay images and which enables at least one target page with which a selected overlay image overlaps to be selected from a plurality of pages on which images are formed based on one of a plurality of selection methods, an operation input unit that receives an operation which a user inputs to the setting screen made to be displayed by the display control unit, an information obtaining unit that obtains selected image information indicating a selected overlay image in the setting screen based on the operation input received by the operation input unit, target page information indicating a target page selected as a target with which the selected overlay image overlaps, and selection method information indicating a selection method used to select the target page, and an image setting unit that sets an overlay image which is set to overlap by the selection method with the highest priority order of the selection methods used to select a page, to an overlay image overlapping with the page when there is a page which is selected in an overlapping manner by a plurality of selection methods based on the information obtained by the information obtaining unit.

20 Claims, 11 Drawing Sheets

(56) References Cited

U.S. PATENT DOCUMENTS

| | | |
|---|---|---|
| 2010/0053342 A1* | 3/2010 | Hwang et al. ............ 348/207.99 |
| 2010/0064248 A1* | 3/2010 | Lee et al. ...................... 715/781 |
| 2010/0073692 A1* | 3/2010 | Waltman et al. ............... 358/1.1 |
| 2010/0107100 A1* | 4/2010 | Schneekloth et al. ........ 715/765 |
| 2010/0141784 A1* | 6/2010 | Yoo ............................ 348/222.1 |
| 2010/0201709 A1* | 8/2010 | Yang et al. .................... 345/629 |
| 2011/0170008 A1* | 7/2011 | Koch ........................... 348/592 |

* cited by examiner

IMAGE PROCESSING SYSTEM, IMAGE PROCESSING METHOD, AND COMPUTER READABLE RECORDING MEDIUM STORING PROGRAM THEREOF

CROSS-REFERENCE TO RELATED APPLICATION

This application is based upon and claims the benefit of priority from U.S. provisional application 61/310,943, filed on Mar. 5, 2010; the entire contents of which are incorporated herein by reference.

FIELD

Embodiments described herein relate generally to an image forming process in which overlay printing is performed.

BACKGROUND

In recent years, when an image is formed by an image forming device such as an MFP (Multi Function Peripheral), there are image forming devices which can perform so-called overlay printing in which an image is formed by overlapping another image data.

In the overlay printing, for example, images used during the overlay printing are registered in an image forming device or a client terminal in advance. In addition, when pages created using an application such as document creation software are printed in the client terminal, the registered overlay images are selected on a setting screen for a printer driver and a print job in which the overlay printing is set is output. Thereby, the image forming device can perform printing by overlapping the overlay image with an image on a page to be printed.

Even if an image which is desired to be overlapped is not inserted in the course of creating data in an application, it is possible to print the same image as a background of a plurality of pages or print the same mark on a plurality of pages by the overlay printing.

However, in the overlay printing, typically, the same image is only printed on a plurality of pages in an overlapping manner, and an arbitrary image cannot be printed on an arbitrary page so as to overlap with each other.

DETAILED DESCRIPTION

According to an embodiment, an image forming processing system includes a display control unit, an operation input unit, an information obtaining unit, and an image setting unit.

The display control unit displays a setting screen which enables at least one overlay image overlapping with a page to be selected from a plurality of predetermined overlay images and which enables at least one target page with which a selected overlay image overlaps to be selected from a plurality of pages on which images are formed based on one of a plurality of selection methods. The operation input unit receives an operation which a user inputs to the setting screen made to be displayed by the display control unit. The information obtaining unit obtains a selected image information indicating a selected overlay image in the setting screen based on the operation input received by the operation input unit, target page information indicating a target page selected as a target with which the selected overlay image overlaps, and selection method information indicating a selection method used to select the target page. The image setting unit sets an overlay image which is set to overlap by the selection method with the highest priority order of the selection methods used to select a page, to an overlay image overlapping with the page when there is a page which is selected in an overlapping manner by a plurality of selection methods based on the information obtained by the information obtaining unit.

Hereinafter, embodiments will be descried with reference to the accompanying drawings.

First Embodiment

Figure 1:
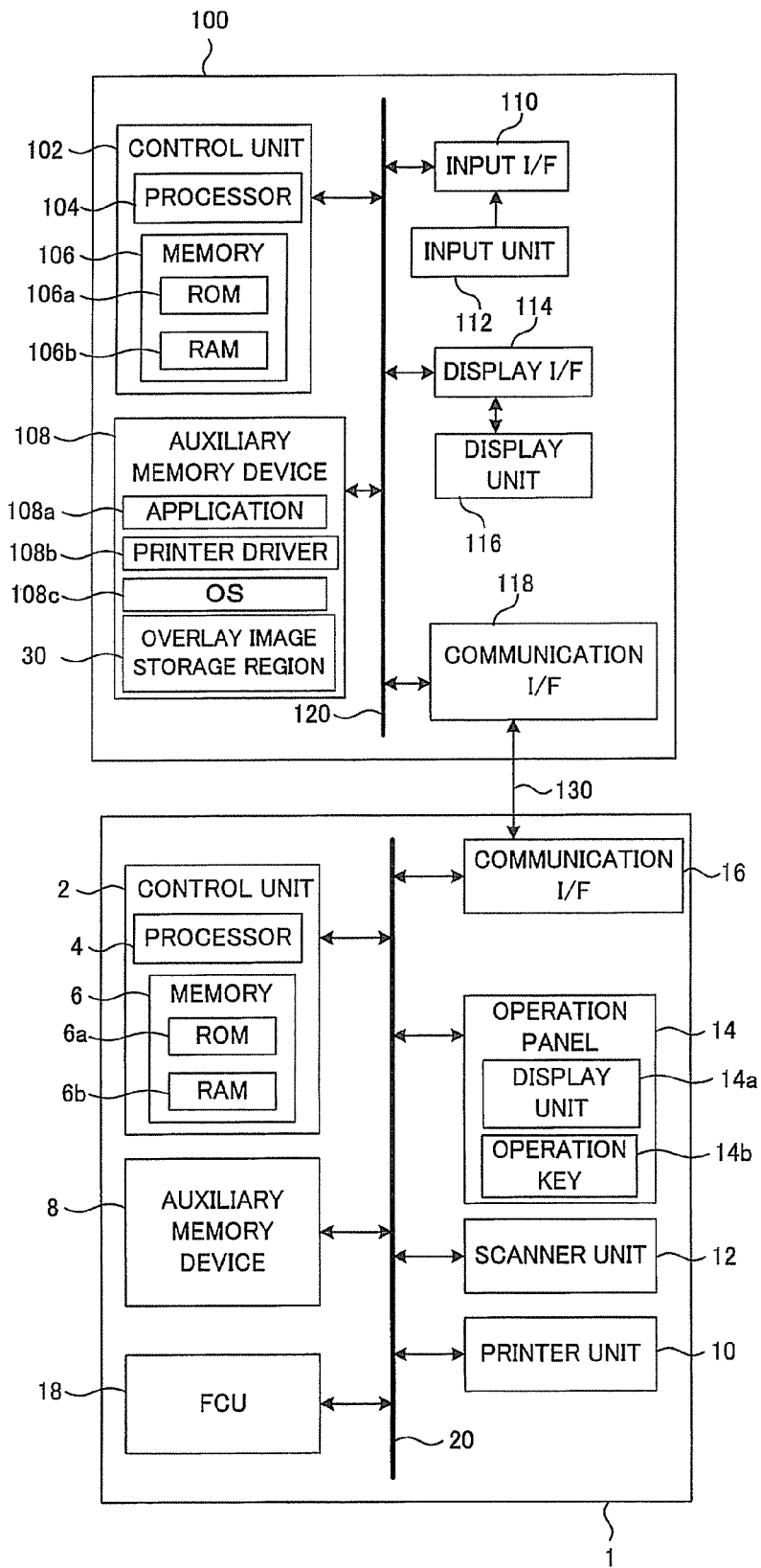
FIG. 1 is a block diagram illustrating a configuration of a system including an image forming device and a client terminal.

FIG. 1 is a block diagram illustrating a configuration of a system including an image forming device 1 and a client terminal 100 in this embodiment.

First, the client terminal 100 includes a control unit 102, an auxiliary memory device 108, an input interface (input I/F) 110, an input unit 112 as an operation input unit, a display interface (display I/F) 114, a display unit 116, and a communication interface (communication I/F) 118. The respective components of the client terminal 100 are connected to each other via a bus 120. In addition, a PC (Personal Computer) may be used as the client terminal 100.

The control unit 102 performs the functions thereof using a processor 104 constituted by a CPU (Central Processing Unit) or an MPU (Micro Processing Unit), a memory 106, and an operating system (OS) 108c.

The processor 104 executes an application 108a stored in the auxiliary memory device 108, activates a printer driver 108b, and generates a print job based on printing target data. The processor 104 transmits the generated print job to the image forming device 1 via the communication I/F 118 and a network 130. The processor 104 in this embodiment executes the printer driver 108b and generates a print job for performing the overlay printing on an arbitrary page.

The memory 106 is, for example, a semiconductor memory, and has a ROM (Read Only Memory) 106a storing control programs for the processor 104 and a RAM (Random Access Memory) 106b which provides a temporary work area to the processor 104.

The auxiliary memory device 108 stores the application program 108a, the printer driver 108b, and the OS 108c which is a control program for the processor 104. In addition, the auxiliary memory device 108 in this embodiment includes an overlay image storage region 30.

The application program 108a functions as software of the OS 108c. The application program 108a includes a web application in addition to typical software such as document creation software.

The printer driver 108b is a device driver which controls the image forming device 1 in response to a printing instruction from the application program 108a and functions as software of the OS 108c.

The overlay image storage region 30 is a region storing overlay images which are overlapped on a page to be printed when the overlay printing is performed. Images stored in the overlay image storage region 30 can be selected as overlay images when the overlay printing is set by activating the printer driver.

The auxiliary memory device 108 having the above-described functions may use, for example, a hard disk drive, other magnetic storage devices, an optical storage device, a semiconductor storage device such as a flash memory, or an arbitrary combination thereof.

The input I/F 110 is an interface connected to the input unit 112. The input unit 112 is a pointing device such as a keyboard device or a mouse.

The display I/F 114 is an interface connected to the display unit 116. The display I/F 114 receives data displayed on the display unit 116 from other components connected to the bus 120. The display I/F 114 outputs display data to the display unit 116. The display unit 116 displays the output display data. The display unit 116 is, for example, a display associated with a PC.

The communication I/F 118 is an interface connected to external devices. The communication I/F 118 communicates with external devices (for example, the image forming device 1, another PC, or a USB device) via the network 130 by suitable wireless or wired communication based on IEEE 802.15, IEEE 802.11, IEEE 802.3, IEEE 1284, or the like, such as, for example, Bluetooth (registered trademark), an infrared connection, or an optical connection. The control unit 102 communicates with the image forming device 1, other PCs, USB devices, and other external devices, via the communication I/F 118. In this embodiment, a print job is transmitted to the image forming device 1 via the communication I/F 118.

Next, the image forming device 1 includes a control unit 2, the auxiliary memory device 8, a printer unit 10, a scanner unit 12, an operation panel 14, a communication interface (communication I/F) 16, and a facsimile control unit (FCU) 18. The respective components of the image forming device 1 are connected to each other via a bus 20.

The control unit 2 performs the functions thereof using a processor 4, a memory 6, and an operating system (OS).

The processor 4 may be a CPU (Central Processing Unit) or an MPU (Micro Processing Unit).

The memory 6 is, for example, a semiconductor memory. The memory 6 has a ROM (Read Only Memory) 6a storing control programs for the processor 4 and a RAM (Random Access Memory) 6b which provides a temporary work area to the processor 4.

The control unit 2 controls the printer unit 10, the scanner unit 12, the operation panel 14, the communication I/F 16, and the FCU 18 based on a control program or the like stored in the ROM 6a or the auxiliary memory device 8. The control unit 2 may also have various image processing functions. In addition, the control unit 2 may include an ASIC (Application Specific Integrated Circuit) realizing a portion or all of the functions of the image forming device 1.

The auxiliary memory device 8 stores an application program and an OS. The application program includes a program which executes functions belonging to the image forming device 1, such as a copying function, a printing function, a scanning function, a facsimile function, and a network file function. The application program also has an application for web clients (web browser) or other applications.

The auxiliary memory device 8 stores image data generated by reading an original document in the scanner unit 12 or data obtained from external devices connected to the communication I/F 16, via the network 130. In addition, in this embodiment, the auxiliary memory device 8 temporarily stores a print job transmitted from the client terminal 100 connected thereto via the network 130 until the print job is executed.

The auxiliary memory device 8 may use, for example, a magnetic storage device such as a hard disk drive, an optical storage device, a semiconductor storage device (such as a flash memory), or an arbitrary combination thereof. The auxiliary memory device 8 appropriately stores software updates, protected electronic documents, text data, account information, policy information, and the like.

The printer unit 10 forms on a sheet an image corresponding to image data for an original document read by the scanner unit 12 or an image corresponding to data sent from a computer including the external client terminal 100 via the network 130.

The scanner unit 12 includes an embedded scanning reading unit which reads an original document as an image, a document placing board, and an automatic document feeder which carries a document to a reading position. The scanning reading unit of the scanner unit 12 reads an original document set in the document placing board or the automatic document feeder.

The operation panel 14 includes a touch panel type display unit 14a and various kinds of operation keys 14b. The display unit 14a displays indication items regarding printing conditions such as, for example, paper size, the number of copied sheets, printing density settings, or finishing (binding, folding). The operation keys 14b include, for example, ten keys (numeric keys), a reset key, a stop key, and a start key. A user can perform various processes or instructions regarding the items displayed on the display unit 14a by inputting from the display unit 14a or the operation keys 14b.

The communication I/F 16 is an interface connecting the image forming device 1 to the client terminal 100 via the network 130. In addition, FIG. 1 shows the configuration in which the image forming device 1 is connected to the client terminal 100, but the communication I/F 16 may be connected to other external devices via the network 130. The communication I/F 16 is connected to other external devices via the network 130 by suitable wireless or wired communication based on IEEE 802.15, IEEE 802.11, IEEE 802.3, IEEE 1284, or the like, such as, for example, Bluetooth (registered trademark), an infrared connection, or an optical connection. The communication I/F 16 includes a buffer, and temporarily stores a portion or all of the data received via the network 130 in the buffer.

The control unit 2 communicates with a PC (Personal Computer) including the client terminal 100 which is connected thereto via the network 130 or other external devices, through the communication I/F 16.

The facsimile control unit (FCU) 20 controls transmission and reception of facsimile in the image forming device 1.

Figure 2:
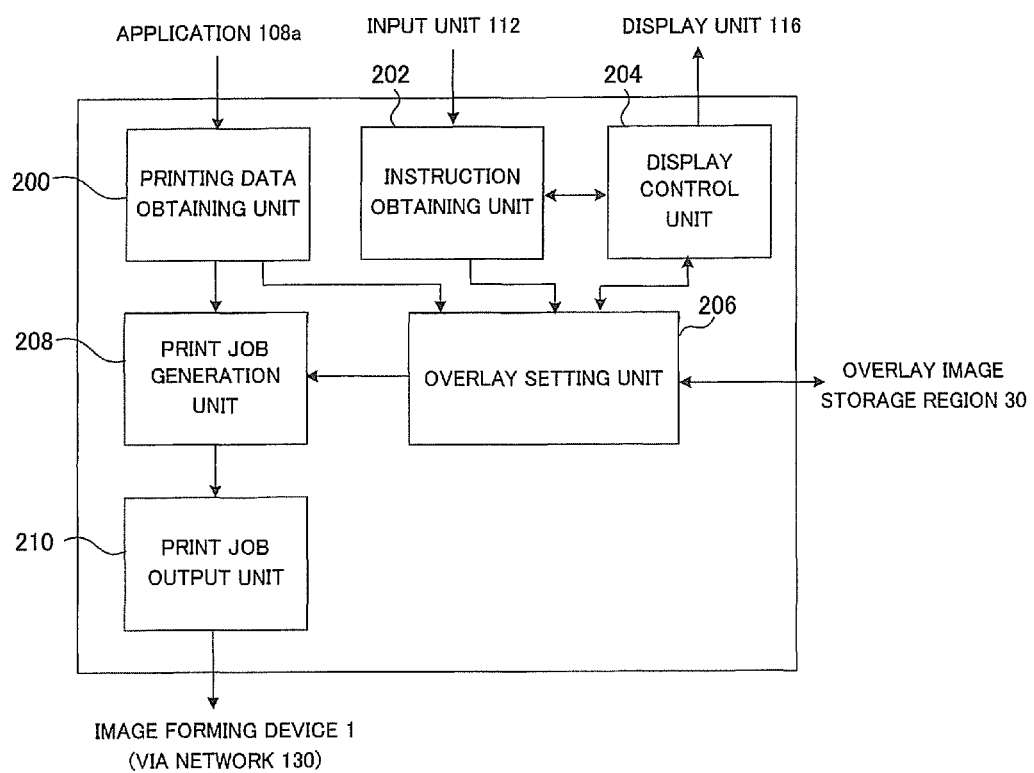
FIG. 2 is a functional block diagram of the client terminal.

Next, a process for creating a print job in which the overlay printing is set, which is executed in the client terminal 100, will be described. FIG. 2 is a functional block diagram of the client terminal 100.

The client terminal 100 in this embodiment includes a printing data obtaining unit 200, an instruction obtaining unit 202, a display control unit 204, an overlay setting unit 206, a print job generation unit 208, and a print job output unit 210.

If the application 108a which is being executed in the client terminal 100 instructs printing, the printing data obtaining unit 200 obtains data for a page to be printed from the application 108a.

The instruction obtaining unit 202 obtains an instruction for activating the printer driver for performing printing through an operation or the like of the input unit 112 by a user. In addition, when the printer driver is activated and a setting screen is displayed, the instruction obtaining unit 202 obtains various instructions input via the setting screen for the printer driver. In addition, the instruction obtaining unit 202 finally obtains an operation input for instructing printing to be performed.

The display control unit 204 displays the setting screen for the printer driver on the display unit 116 based on the instruction obtained by the instruction obtaining unit 202. In addition, the display control unit 204 in this embodiment controls a setting screen for setting the overlay printing in a state where the setting screen for the printer driver is displayed and when the setting screen for setting the overlay printing is instructed to be displayed.

The overlay setting unit 206 obtains information required to display the setting screen when there is an instruction for displaying the setting screen for the overlay printing. The information required to display the setting screen is, for example, image data for an overlay image which overlaps with a page to be printed and is used when the overlay printing is performed. The overlay image is stored in the overlay image storage region 30. In addition, the overlay setting unit 206 which is an information obtaining unit, obtains overlay setting information, which is setting information for the overlay printing, corresponding to a setting content input to the setting screen, when the setting for the overlay printing is completed, and outputs the obtained information to the print job generation unit 208.

Figure 3:
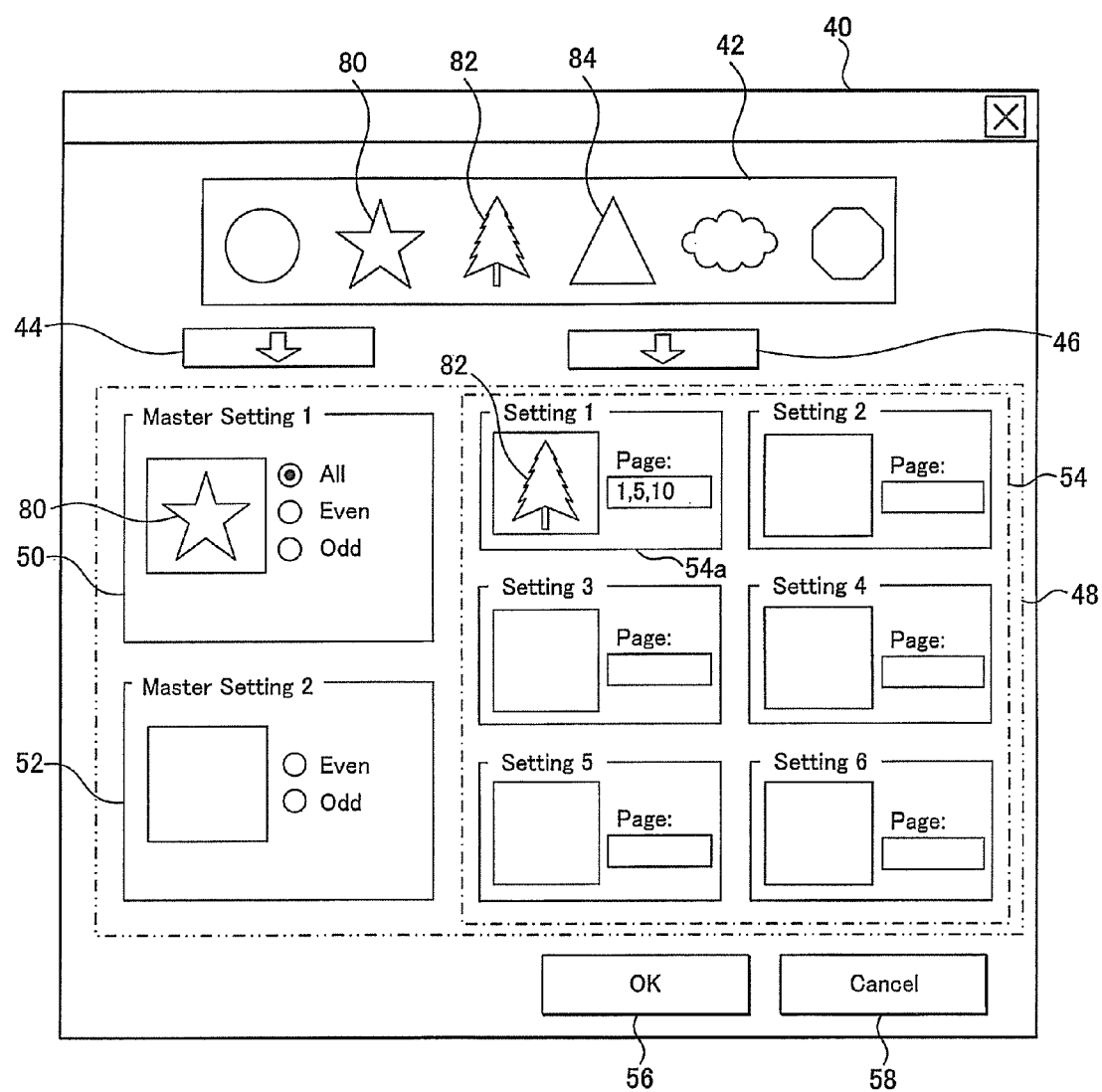
FIG. 3 is a diagram illustrating an example of a setting screen for overlay printing.

Here, the setting for the overlay printing in the client terminal 100 in this embodiment will be described in detail. FIG. 3 shows an example of a setting screen for the overlay printing according to this embodiment. For example, in the setting screen for the printer driver, if there is an instruction for displaying a screen for setting the overlay printing from the input unit 112, the display control unit 204 makes the display unit 116 display an overlay setting screen 40 as shown in FIG. 3.

The overlay setting screen 40 displays an overlay image display column 42 and an overlay page setting column 48.

The overlay image display column 42 is a column displaying images used as overlay images when the overlay printing is performed. In addition, overlay images displayed in the overlay image display column 42 are information required to display the overlay setting screen 40 as described above, and the overlay images are displayed by the overlay setting unit 206 obtained from the overlay image storage region 30.

The overlay page setting column 48 is a setting column where which page overlaps with an image selected as an overlay image and is printed of print target pages is input and selected. In this embodiment, as the overlay page setting column 48, a first master setting column 50, a second master setting column 52, and first to sixth setting columns 54 are displayed.

In the first master setting column 50, in order to apply a first master setting, whether a selected image is displayed on all the pages, even pages, or odd pages can be designated. In FIG. 3, the input unit 112 such as a mouse is operated, and the image 80 in the overlay image display column 42 is designated as an image for applying the first master setting based on the setting in the first master setting column 50. In addition, in the first master setting, for the selection of pages, all pages are selected by checking the item "all".

In the second master setting column 52, in order to apply a second master setting, whether a selected image is displayed on even pages or odd pages can be designated. In addition, in FIG. 3, a state is shown in which, in the second master setting column 52, an image is not selected and the second master setting is not set.

In addition, the overlay setting unit 206 controls the setting screen such that when the item "even" is selected in the first master setting column 50, the item "odd" is only selected in the second master setting column 52. In addition, the overlay setting unit 206 controls the setting screen such that when the item "odd" is selected in the first master setting column 50, the item "even" is only selected in the second master setting column 52.

In the first to sixth setting columns 54, pages displaying a selected image can be designated by inputting arbitrary page numbers. In FIG. 3, the image 82 in the overlay image display column 42 is displayed on the first setting column 54a and is designated as an image for applying a first setting. In addition, the page numbers are designated as 1, 5, and 10, and thus the first setting designates the image 82 to be displayed on pages 1, 5, and 10. In addition, for the designation of images, images in the overlay image display column 42 are selected, and thereafter the images can be sequentially designated in the overlay page setting column 48 by pressing the button 44 or 46. In addition, a desired image may be allocated to a desired setting by an operation such as drag and drop.

As such, in the overlay setting screen 40, when an overlay image to be printed, pages displaying the overlay image, and the like are respectively designated, and the OK button 56 is pressed, the overlay setting unit 206 obtains overlay setting information based on the setting content. The overlay setting information includes at least information in which information for a selected overlay image, target page information for designating pages on which the images are overlay-printed, and selection method information used to select the pages are correlated with each other. In addition, the overlay setting unit 206 obtains the selected overlay image as an image used in the overlay printing from the overlay image storage region 30.

When the overlay setting information is obtained by the setting content shown in FIG. 3, overlay setting information is generated in which target page information indicating all pages and selection method information that all the pages are selected are correlated with image data for the image 80, and overlay setting information is generated in which target page information designating the pages 1, 5, and 10 and selection method information that arbitrary pages are selected are correlated with image data for the image 82.

In addition, by the first master setting, the second master setting, and settings (the first to sixth settings in this embodiment) capable of designating arbitrary pages, the overlay setting is possible by a total of three kinds: the selection of arbitrary pages; the selection of even and odd pages; and the selection of all pages. For this reason, according to the setting content, different images are set in the same page together.

Thereby, the image forming device 1 sets an overlay image set by higher priority order as an overlay image for a target page and performs overlay printing, based on a priority order set in advance, with respect to the three kinds of selection methods of pages. For the priority order in this embodiment, the priority order for the arbitrary page selection method is the highest, the priority order for the even and odd page selection method is the next, and the priority order for the all page selection method is the lowest.

For example, when a print job including the overlay setting information for the settings shown in FIG. 3 is output, the image 80 is allocated to all the pages and the image 82 is allocated to the pages 1, 5, and 10, and thus the images are set in the pages 1, 5, and 10 so as to be overlapped with each other. In this case, the image forming device 1 compares the priority orders for the arbitrary page selection method set in the first setting and the all page selection method set in the first master setting, and first applies the setting for the arbitrary page selection with the higher priority order, and performs overlay printing.

In other words, the image forming device 1 overlaps the image 82 with the pages 1, 5, and 10 which are selected by the arbitrary page selection method and overlaps the image 80 with the remaining pages, thereby performing overlay printing. In this way, since the priority orders for the three kinds of page selection methods are defined and the overlay printing is performed based on the priority orders, it is possible to perform overlay printing in which a desired image is displayed on desired pages.

Further, in order to appropriately set overlay in the above-described overlay setting screen 40, a user is required to ascertain in advance the priority orders for the three kinds of page selection methods of arbitrary page designation, even and odd page designation, and all page designation, at the time of the overlay printing.

However, the result of the settings in the overlay setting screen 40 may display which overlay image is actually displayed on each page.

Figure 4:
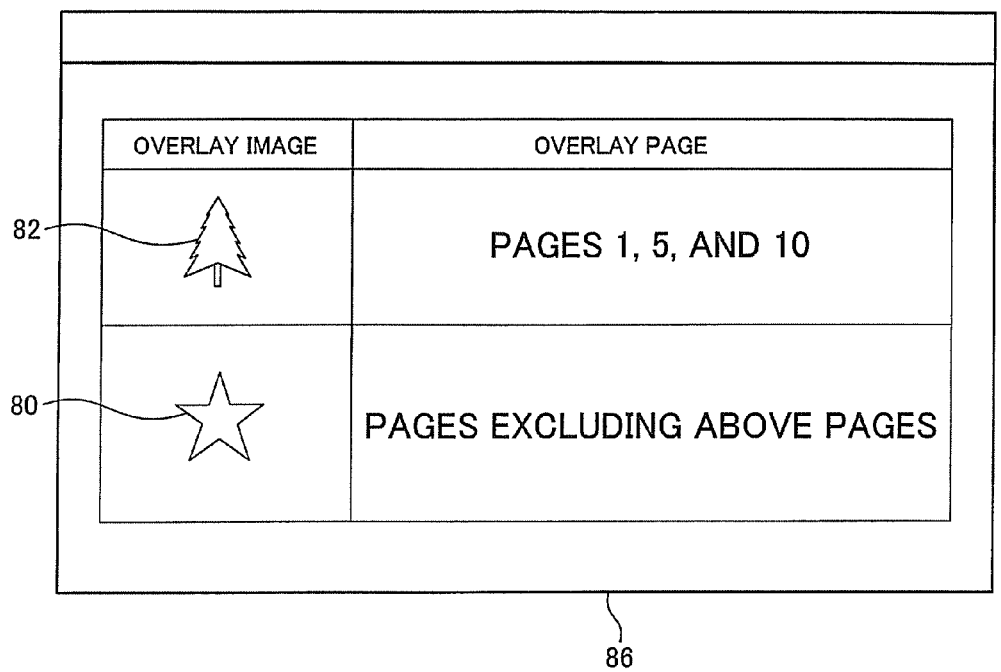
FIG. 4 is an example of a confirmation screen for settings for the overlay printing.

For example, after the OK button 56 on the overlay setting screen 40 is pressed, a confirmation screen 86 as shown in FIG. 4 may be displayed. In addition, this confirmation screen 86 may be displayed in the overlay setting screen 40. The confirmation screen 86 is displayed in the overlay setting screen 40, and selection of pages or input of pages in the overlay page setting column 48 are reflected on the confirmation screen 86 in real time, which lead to easy understanding.

In addition, when the image forming device 1 performs overlay printing, if there are pages which are selected so as to overlap with each other by different kinds of selection methods, details of a process for determining the priority orders for the page selection methods and allocating an image to each page will be described in detail when description of the functional block of the image forming device 1 is made.

The print job generation unit 208 generates PDL (Page Description Language) data using data for pages to be printed which is obtained from the application 108a by the printing data obtaining unit 200. In addition, the print job generation unit 208 generates a print job in which the generated PDL data is correlated with the overlay setting information generated by the overlay setting unit 206.

The print job output unit 210 outputs the print job generated by the print job generation unit 208 to the image forming device 1 via the communication I/F 118 and the network 130.

Figure 5:
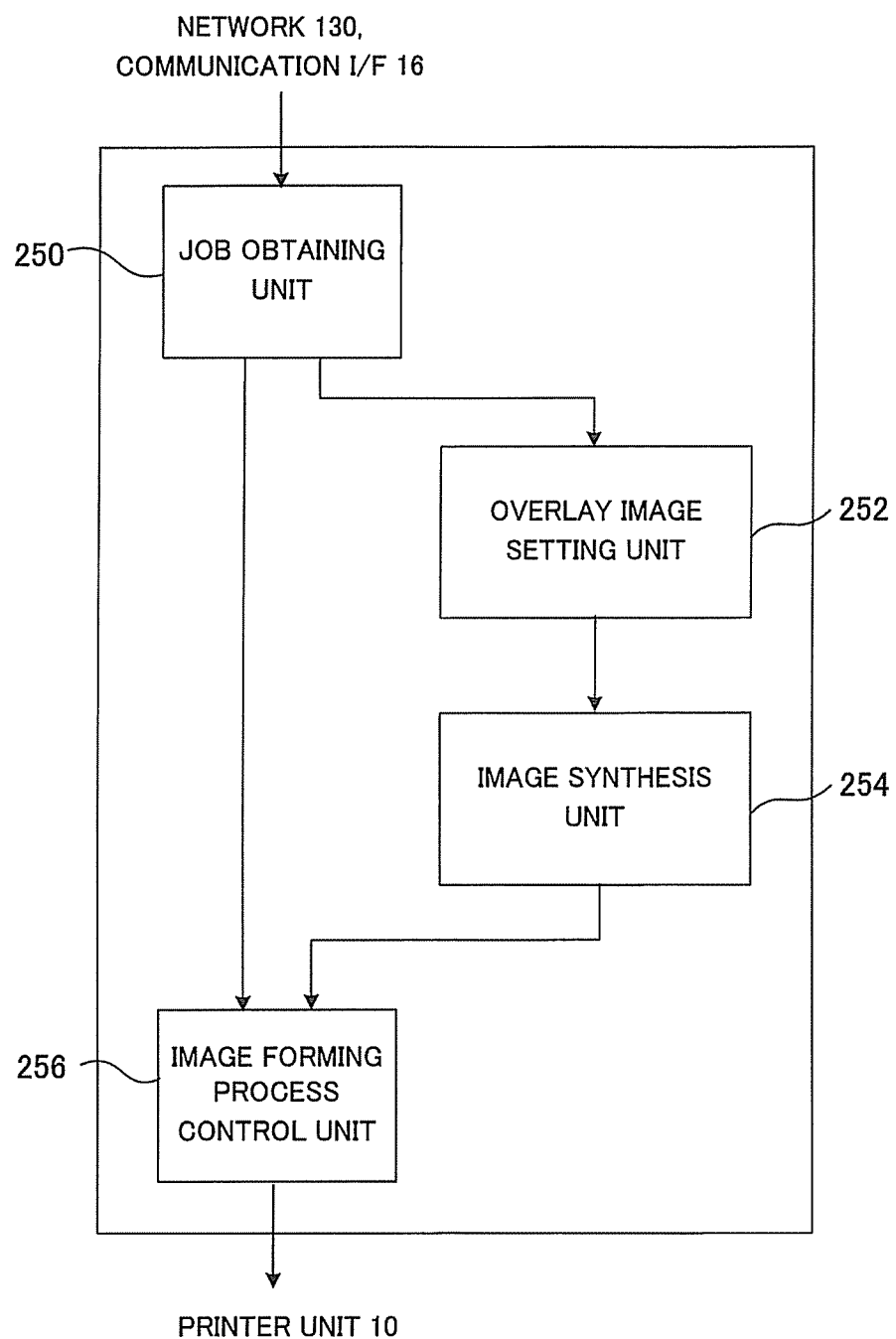
FIG. 5 is a functional block diagram of the image forming device.

Next, the overlay printing performed by the image forming device 1 will be described. FIG. 5 is a functional block diagram illustrating the functions of the image forming device 1.

The image forming device 1 includes a job obtaining unit 250, an overlay image setting unit 252 as an image setting unit, an image synthesis unit 254 as a synthesis unit, and an image forming process control unit 256.

The job obtaining unit 250 obtains the print job output from the client terminal 100 via the network 130, through the communication I/F 16. In addition, the job obtaining unit 250 outputs overlay setting information to the overlay image setting unit 252 if the overlay printing is set in the obtained print job, that is, the overlay setting information is included in the print job.

When the overlay setting information is included in the print job obtained by the job obtaining unit 250, the overlay image setting unit 252 sets an overlay image which is displayed on each page so as to overlap with each other. Specifically, the overlay image setting unit 252 sets an overlay image for each page based on the priority orders for three kinds of page selection methods stored in either of the storage regions of the image forming device 1 in advance, and the selection method information included in the overlay setting information, with respect to the pages in which the overlay image is set.

In the case of the print job generated according to the setting contents in the screen example shown in FIG. 3, the image 82 is designated at the pages 1, 5, and 10, and the image 80 is designated at all the pages. Therefore, the overlay image confirmation unit 252 confirms an overlay image to the image 82 with respect to the pages 1, 5, and 10 which are selected by the arbitrary page selection method which is a selection method with the highest priority order. In addition, the overlay image confirmation unit 252 confirms an overlay image for the remaining pages to the image 80 which is set in the all page selection method with the lower priority than that of the arbitrary page selection method.

In addition, for example, when still another image 84 is set to be displayed on even pages in the second master setting in addition to the above-described setting content, the selection of even pages which are smaller in the selected pages has the higher priority order than the selection of all pages. Therefore, the image 82 is confirmed as an overlay image for the pages 1, 5, and 10, and the image 84 is set as an overlay image for the even pages excluding the page 10. The image 80 is allocated to the remaining odd pages excluding the page 1 and the page 5 as an overlay image.

The image synthesis unit 254 synthesizes the overlay images which are allocated to the respective pages to be printed with corresponding data for the respective pages, respectively.

The image forming process control unit 256 makes the printer unit 10 form an image based on data for the synthesized image generated by the image synthesis unit 254. In addition, the image forming process control unit 256 may perform a RIP process in which the PDL data is converted into bit map image data.

Further, if overlay setting information is not included in the print job obtained by the job obtaining unit 250, the image forming process control unit 256 may form an image based on the print job without change.

Figure 6:
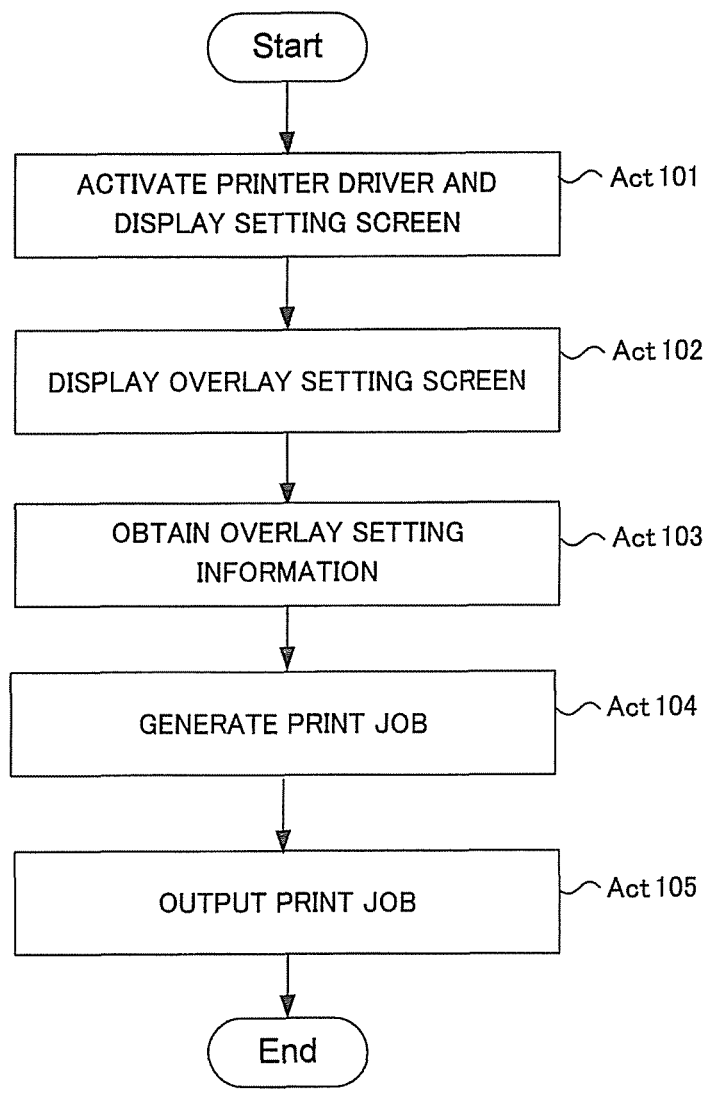
FIG. 6 is a flowchart illustrating a flow of a process for generating a print job executed by the client terminal.

Next, a flow of the print job creation process including the overlay printing setting by the client terminal 100 according to this embodiment will be described. FIG. 6 is a flowchart illustrating a flow of a process for generating a print job executed by the client terminal 100.

First, if a user instructs the printer driver to activate through an operation input using the input unit 112 so as to set printing settings, the instruction obtaining unit 202 obtains the activation instruction, and the display control unit 204 displays a setting screen for the printer driver on the display unit 116 (Act 101).

Next, if the user instructs the overlay setting screen 40 to be displayed so as to set the overlay printing, the overlay setting unit 206 makes the display control unit 204 display the overlay setting screen 40 (Act 102). At this time, when images which can be selected as overlay images are displayed as thumbnail images on the overlay image display column 42 shown in FIG. 3, the overlay setting unit 206 obtains stored image data from the overlay image storage region 30 so as to be displayed.

Then, when the user performs an operation input, sets the overlay printing, and presses the OK button 50 in the overlay setting screen 40, the overlay setting unit 206 obtains overlay setting information based on the setting content in the overlay setting screen 40 (Act 103).

Thereafter, the print job generation unit 208 generates a print job by correlating data (PDL data) for pages on which images are formed, obtained from the application 108a by the printing data obtaining unit 200 with the overlay setting information obtained by the overlay setting unit 206 (Act 104).

Successively, the print job output unit 210 outputs the print job generated by the print job generation unit 208 to the image forming device 1 (Act 105).

The above description corresponds to the flow of the print job generation process including the overlay printing setting in the client terminal 100 according to this embodiment.

Figure 7:
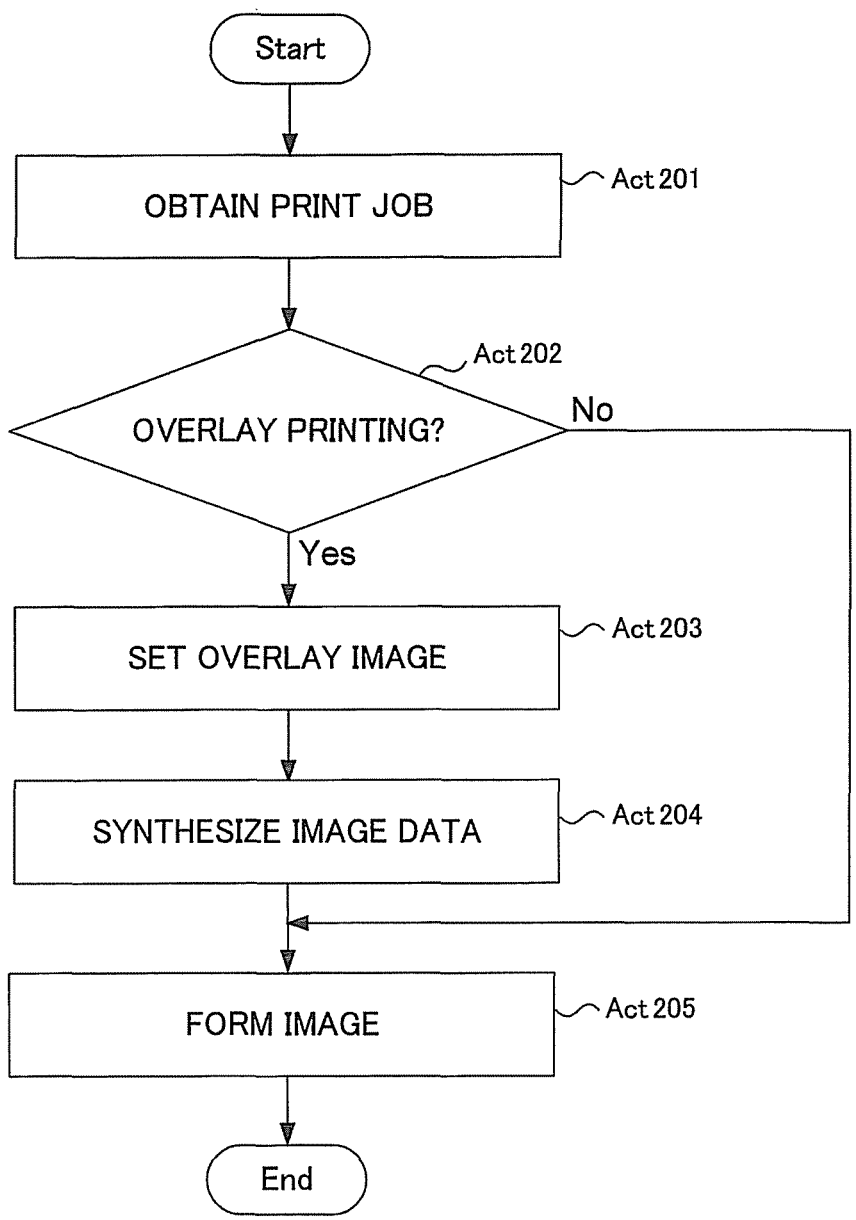
FIG. 7 is a flowchart illustrating a flow of a process for forming an image executed by the image forming device.

Next, a flow of an image forming process when the image forming device 1 according to this embodiment obtains the print job will be described. FIG. 7 is a flowchart illustrating a flow of the image forming process performed by the image forming device 1.

First, the job obtaining unit 250 obtains the print job output from the client terminal 100 (Act 201).

Next, the job obtaining unit 250 determines whether or not the overlay printing is set in the obtained print job (Act 202).

If the overlay printing is set (Act 202, Yes), the overlay image setting unit 252 sets an image which overlaps with each page on which the image is formed, based on the overlay setting information included in the print job (Act 203).

As described above, in the overlay setting information in this embodiment, pages on which overlay images are formed are selected by one of three kinds of selection methods: the arbitrary page selection method for designating an image at arbitrary pages; the even and odd page selection method for selecting even pages or odd pages; and the all page selection method. In addition, the priority orders for the selection methods are stored in the image forming device 1 in advance, and the priority order is in order of the arbitrary page selection, the even and odd page selection, and the all page selection. Based on the stored priority orders, the overlay image setting unit 252 allocates a corresponding image to pages selected by the arbitrary page selection, allocates an image to pages excluding the pages selected by the arbitrary page selection, based on the even and odd page selection, and finally allocates an image to the remaining pages based on the all page selection.

Thereafter, the image synthesis unit 254 synthesizes images by overlapping the image for each page which is set by the overlay image setting unit 252 in Act 203 with data for each page, with respect to each page to be printed (Act 204).

Then, the image forming process control unit 256 forms images based on the synthesized images generated in Act 204 (Act 205).

On the other hand, if it is determined that the overlay printing is not set in Act 202 (Act 202, No), the image forming process control unit 256 forms images without change based on the print job obtained by the job obtaining unit 250 (Act 205).

The above description corresponds to the flow of the image forming process in the image forming device 1 according to this invention.

According to this embodiment described above, it is possible to allocate a desired image to a desired page and to perform overlay printing.

In addition, according to the overlay printing setting method according to this embodiment, even if the number of pages to be printed is large, it is possible to allocate a desired image to a desired page and to perform overlay printing by simple settings.

In addition, this embodiment described the example where the overlay image storage region 30 storing the overlay images used in the overlay printing is included in the auxiliary memory device 108 of the client terminal 100, but this embodiment is not limited thereto. For example, the image forming device 1, or other servers or client terminals connected via the network 130 may include the overlay image storage region 30. In this case, the client terminal 100 may access the image forming device 1 or the server or the like including the overlay image storage region 30 when a print job for the overlay printing is generated, and obtain the designated image data.

In addition, this embodiment described the example where the client terminal 100 generates a print job including image data for overlay images and outputs the print job to the image forming device 1, but this embodiment is not limited thereto. As a print job, the client terminal 100 may generate a print job including only information for identifying overlay images, not including image data for the designated overlay images. In this case, it is preferable that the image forming device 1 obtains designated overlay images from the overlay image storage region 30 based on the information for identifying the overlay images included in the obtained print job and synthesizes the images. Also, in this case, if the image forming device 1 includes the overlay image storage region 30 storing overlay images, the process can be performed promptly.

In addition, this embodiment describes the example where overlay images are images stored in the overlay image storage region 30 in advance, but this embodiment is not limited thereto. For example, when a print job is created, images stored in regions other than the overlay image storage region 30 may be designated as overlay images.

Further, this embodiment describes the example where the overlay setting information is correlated with the PDL data and is included in a print job, but this embodiment is not limited thereto. The overlay setting information may be processed independently from the print job. Specifically, the client terminal 100 may output a print job including PDL data for pages on which an image is formed to the image forming device 1, and generate overlay setting information independently from the print job which is output to the image forming device 1. In this case, the image forming device 1 allocates a designated overlay image designated in the overlay setting information to pages on which an image is formed using the print job and the overlay setting information corresponding to the print job and generates synthesized images, which leads to the overlay printing.

Second Embodiment

Next, a second embodiment will be described. When the overlay printing is set in the above-described overlay setting screen 40, this embodiment is different from the first embodiment in that the client terminal 100 sets an overlay image for each page according to the priority orders for the three kinds of selection methods. In addition, in the following description of this embodiment, description of the configuration common to the first embodiment will be omitted.

Figure 8:
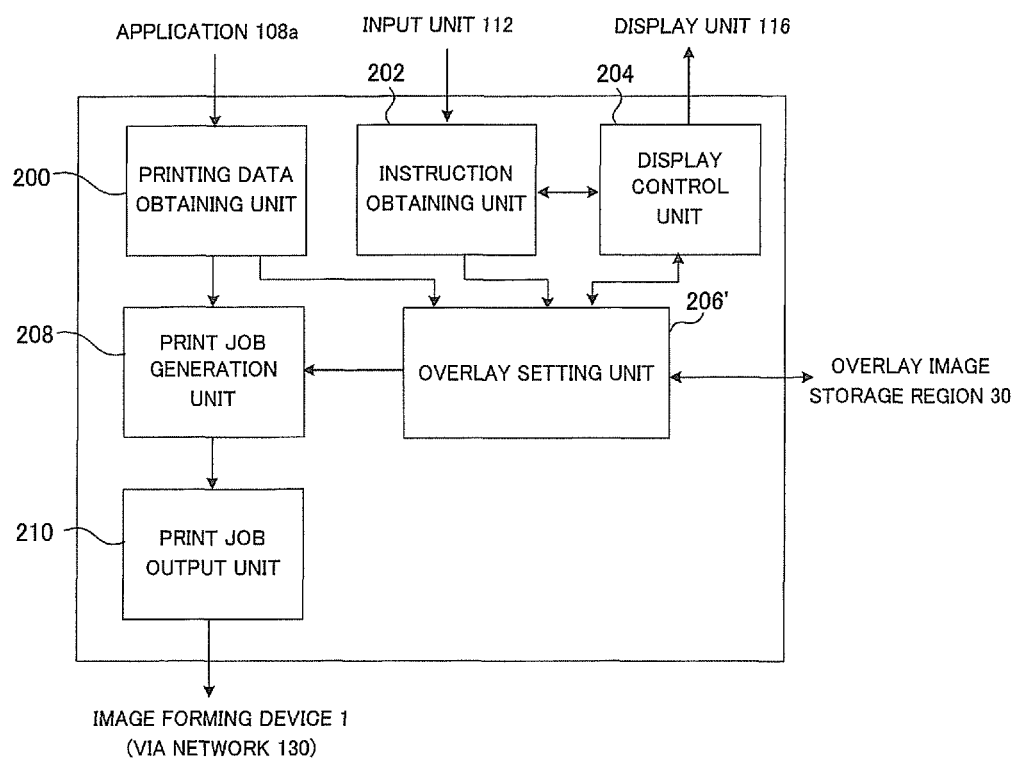
FIG. 8 is a functional block diagram of the client terminal.

A process for creating a print job in which overlay printing is set, executed by the client terminal 100 according to this embodiment, will be described. FIG. 8 is a functional block diagram of the client terminal 100 according to this embodiment.

The client terminal 100 in this embodiment includes a printing data obtaining unit 200, an instruction obtaining unit 202, a display control unit 204, an overlay setting unit 206', a print job generation unit 208, and a print job output unit 210.

The printing data obtaining unit 200 to the display control unit 204 has the same functions as in the first embodiment.

The overlay setting unit 206' obtains overlay setting information based on setting content in the overlay setting screen 40 in the same manner as the first embodiment. The overlay setting unit 206' in this embodiment also has the function of the overlay image setting unit 252 of the image forming device 1 in the first embodiment. In other words, the overlay setting unit 206' sets an overlay image for each page to be printed based on the settings set in the overlay page setting column 48 and the priority orders for the three kinds of page selection methods. Therefore, the overlay setting information which is finally output to the print job generation unit 208 by the overlay setting unit 206' in this embodiment is information in which an overlay image for each page is correlated with each page.

The print job generation unit 208 generates a print job in which data for pages to be printed obtained from the application by the printing data obtaining unit 200 is correlated with the overlay setting information generated by the overlay setting unit 206'.

The print job output unit 210 outputs the print job generated by the print job generation unit 208 to the image forming device 1.

The above description corresponds to the functional blocks included in the client terminal 100.

Figure 9:
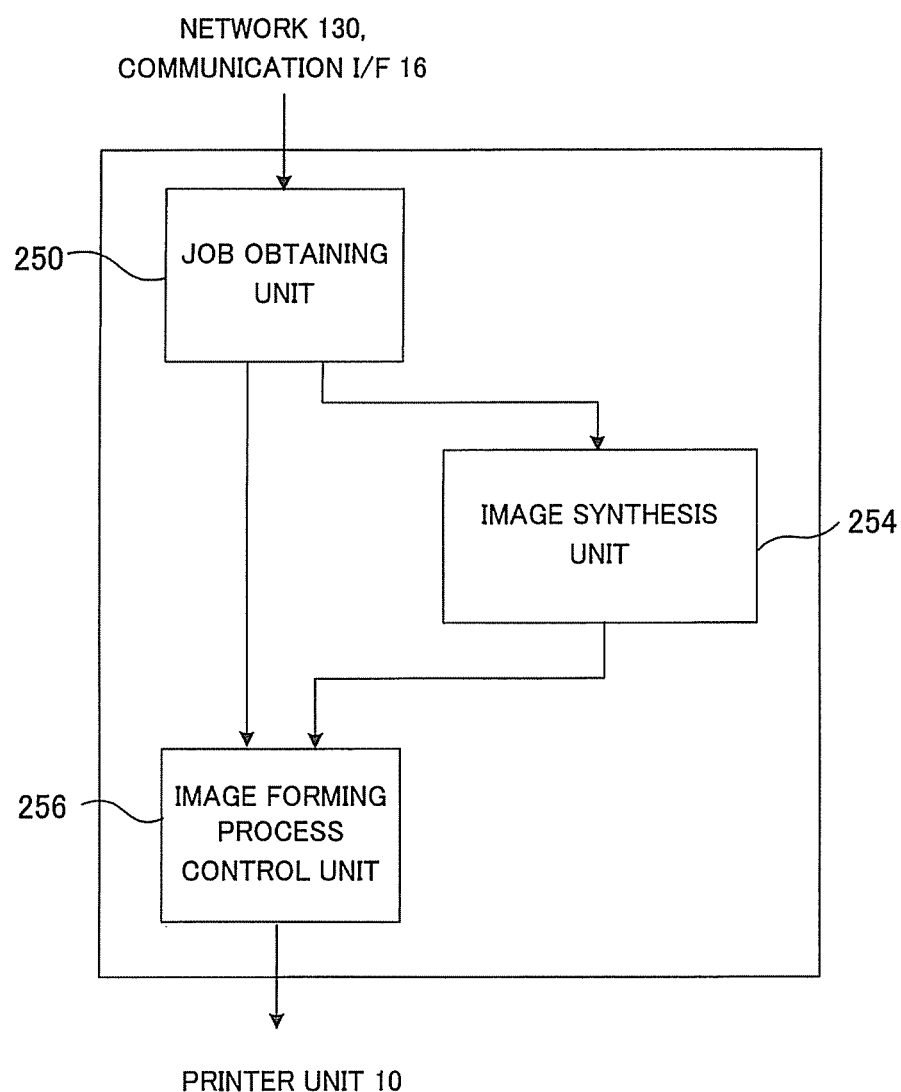
FIG. 9 is a functional block diagram of the image forming device.

Next, the overlay printing performed by the image forming device 1 in this embodiment will be described. FIG. 9 is a functional block diagram of the image forming device 1.

The image forming device 1 in this embodiment includes a job obtaining unit 250, an image synthesis unit 254, and an image forming process control unit 256. In this embodiment, the client terminal 100 has the function of the overlay image setting unit 252 which belongs to the image forming device 1 in the first embodiment. For this reason, the image forming device 1 in this embodiment does not include the overlay image setting unit 252. The function in each functional block is the same as in the first embodiment, and thus description thereof will be omitted.

In addition, in this embodiment, if a print job includes overlay setting information, an overlay image is allocated to each page based on the overlay setting information and the priority orders for the selection methods of pages undergoing overlay printing in the overlay setting information. For this reason, the image synthesis unit 254 can synthesize information for each page with a corresponding overlay image as they are based on the overlay setting information in the print job.

Figure 10:
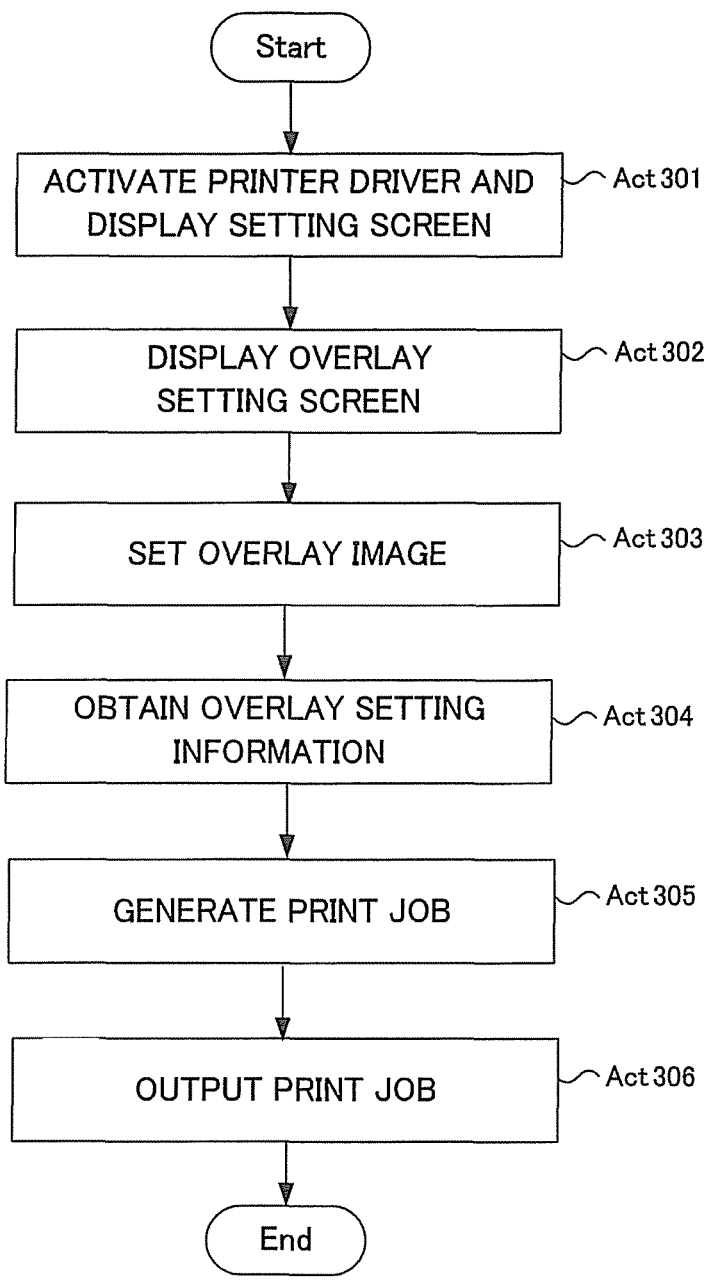
FIG. 10 is a flowchart illustrating a flow of a process for generating a print job executed by the client terminal.

Next, a flow of a process for generating a print job in which overlay printing is set in the client terminal 100 according to this embodiment will be described. FIG. 10 is a flowchart illustrating a flow of a printing job generation process executed by the client terminal 100 in this embodiment.

First, in the same manner as Act 101 in FIG. 6, if a user instructs the printer driver to activate through an operation input using the input unit 112 so as to set printing settings, the instruction obtaining unit 202 obtains the activation instruction, and the display control unit 204 displays a setting screen for the printer driver on the display unit 116 (Act 301).

Next, in the same manner as Act 102 in FIG. 6, if the user instructs the overlay setting screen 40 to be displayed so as to set the overlay printing, the overlay setting unit 206' makes the display control unit 204 display the overlay setting screen 40 (Act 302). At this time, when images which can be selected as overlay images are displayed as thumbnail images on the overlay image display column 42 shown in FIG. 3, the overlay setting unit 206' obtains stored image data from the overlay image storage region 30 so as to be displayed.

Then, when the user performs an operation input, sets the overlay printing, and presses the OK button 50 in the overlay setting screen 40, the overlay setting unit 206' sets an overlay image for each page based on the setting content in the overlay setting screen 40 and the priority orders for the three kinds of page selection methods (Act 303) and generates overlay setting information in which each page is correlated with the overlay image (Act 304).

Also, the print job generation unit 208 generates a print job in which data (PDL data) for pages to be printed is correlated with the overlay setting information generated by the overlay setting unit 206' (Act 305), and the print job output unit 210 outputs the print job to the image forming device 1 (Act 306).

The above description corresponds to the flow of the print job generation process including the overlay printing setting in the client terminal 100 according to this embodiment.

Figure 11:
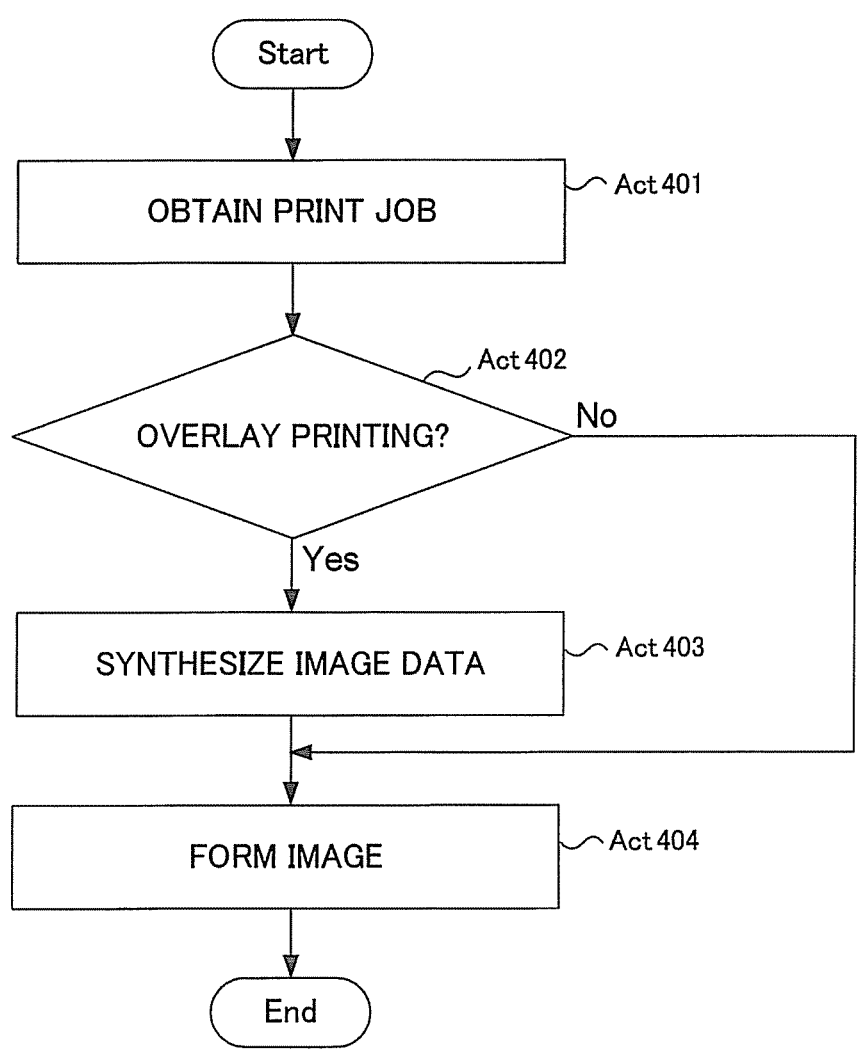
FIG. 11 is a flowchart illustrating a flow of a process for forming an image executed by the image forming device.

Next, a flow of an image forming process when the image forming device 1 according to this embodiment obtains the print job will be described. FIG. 11 is a flowchart illustrating a flow of the image forming process performed by the image forming device 1.

Act 401 is the same as Act 201, Act 402 is the same as Act 202 in FIG. 7, and thus descriptions thereof will be omitted.

If it is determined that overlay printing is set in the print job obtained by the job obtaining unit 250 in Act 402 (Act 402, Yes), the image synthesis unit 254 synthesizes an overlay image correlated with each page with data for a corresponding page in the overlay setting information included in the print job (Act 403).

Next, the image forming process control unit 256 forms images based on the synthesized images which are generated in Act 403 (Act 404).

On the other hand, if it is determined that the overlay printing is not set in Act 402 (Act 402, No), the image forming process control unit 256 forms images based on the print job obtained by the job obtaining unit 250 without change (Act 404).

The above description corresponds to the flow of the image forming process in the image forming device 1 according to this embodiment.

According to this embodiment described above, it is possible to overlap a desired image with a desired page and to perform overlay printing by the simple operation in the same manner as the first embodiment. In addition, in the case of this embodiment, since the client terminal side correlates a page to be printed with corresponding image data, a burden on the overlay printing becomes low in the image forming device 1.

In addition, this embodiment describes the example where the image synthesis unit 254 of the image forming device 1 synthesizes data for a page to be printed with an overlay image, but this embodiment is not limited thereto. The client terminal 100 has the function of the image synthesis unit 254 of the image forming device 1, and the client terminal 100 side may synthesize images for each page. In this case, it is possible to further decrease a burden on the image forming process in the image forming device 1.

As described above in detail, according to the invention, it is possible to provide the image forming device capable of performing overlay printing in which a desired image overlaps with a desired page.

While certain embodiments have been described, these embodiments have been presented by way of example only, and are not intended to limit the scope of invention. Indeed, the novel apparatus and methods described herein may be embodied in a variety of other forms; furthermore, various omissions, substitutions and changes in the form of the apparatus and methods described herein may be made without departing from the sprit of the inventions. The accompanying claims and their equivalents are intended to cover such forms or modifications as would fall within the scope and spirit of the inventions.

What is claimed is:

1. An image processing system comprising:
    a display control unit that displays a setting screen which enables at least one overlay image overlapping with a page to be selected from a plurality of predetermined overlay images and which enables at least one target page with which a selected overlay image overlaps to be selected from a plurality of pages on which images are formed based on one of a plurality of selection methods, the plurality of selection methods include a method for selecting all pages on which images are formed and a method for designating arbitrary pages of pages on which images are formed;
    an operation input unit that receives an operation input which a user inputs to the setting screen to be displayed by the display control unit;
    an information obtaining unit that obtains a selected image information indicating a selected overlay image in the setting screen based on the operation input received by the operation input unit, target page information indicating a target page selected as a target with which the selected overlay image overlaps, and selection method information indicating a selection method used to select the target page; and
    an image setting unit that sets an overlay image which is set to overlap by the selection method with the highest priority order of the selection methods used to select a page, to an overlay image overlapping with the page when there is a page which is selected in an overlapping manner by a plurality of selection methods based on the information obtained by the information obtaining unit, the image setting unit setting the overlay image which is set to overlap by the method for designating arbitrary pages for the page which is selected in an overlapping manner by the method for selecting all pages and the method for designating arbitrary pages.

2. The system according to claim 1, wherein the page selection method used to select a smaller number of pages has a higher priority order.

3. The system according to claim 2, wherein the page selection method is one of a method for selecting all pages on which images are formed, a method for selecting even pages of pages on which images are formed, a method for selecting odd pages on which images are formed, and a method for designating arbitrary pages of pages on which images are formed.

4. The system according to claim 3, wherein the priority order for the selection method for designating arbitrary pages is the highest.

5. The system according to claim 1, wherein the display control unit performs a display indicating a compatibility relationship between an overlay image selected based on the input to the setting screen and a page on which the selected overlay image is formed.

6. The system according to claim 1, wherein the setting screen includes:
    a first setting column which enables a target page with which an overlay image overlaps to be selected by one of a method for selecting all pages on which images are formed, a method for selecting even pages of pages on which images are formed, and a method for selecting odd pages of pages on which images are formed;
    a second setting column which enables a target page with which an overlay image overlaps to be selected by one of a method for selecting even pages of pages on which images are formed, and a method for selecting odd pages of pages on which images are formed; and
    a third setting column which enables a target page with which an overlay image overlaps to be selected by designating arbitrary pages.

7. The system according to claim 1, further comprising a synthesis unit that synthesizes data for each page on which an image is formed with an overlay image, set by the image setting unit, corresponding to each page.

8. An image processing method comprising:
    displaying a setting screen which enables at least one overlay image overlapping with a page to be selected from a plurality of predetermined overlay images and which enables at least one target page with which a selected overlay image overlaps to be selected from a plurality of pages on which images are formed based on one of a plurality of selection methods, the plurality of selection methods include a method for selecting all pages on which images are formed and a method for designating arbitrary pages of pages on which images are formed;
    receiving an operation input which a user inputs to the displayed setting screen;
    obtaining a selected image information indicating a selected overlay image in the setting screen based on the received operation input, target page information indicating a target page selected as a target with which the selected overlay image overlaps, and selection method information indicating a selection method used to select the target page; and
    setting an overlay image which is set to overlap by the selection method with the highest priority order of the selection methods used to select a page, to an overlay image overlapping with the page when there is a page which is selected in overlapping by the plurality of selection methods based on the information obtained by the information obtaining unit, setting the overlay image which is set to overlap by the method for designating arbitrary pages for the page which is selected in an overlapping manner by the method for selecting all pages and the method for designating arbitrary pages.

9. The method according to claim 8, wherein the page selection method used to select a smaller number of pages has a higher priority order.

10. The method according to claim 9, wherein the page selection method is one of a method for selecting all pages on which images are formed, a method for selecting even pages of pages on which images are formed, a method for selecting odd pages of pages on which images are formed, and a method for designating arbitrary pages of pages on which images are formed.

11. The method according to claim 10, wherein the priority order for the selection method for designating arbitrary pages is the highest.

12. The method according to claim 8, further comprising performing a display indicating a compatibility relationship between an overlay image selected based on the input to the setting screen and a page on which the selected overlay image is formed.

13. The method according to claim 8, wherein the setting screen includes:
- a first setting column which enables a target page with which an overlay image overlaps to be selected by one of a method for selecting all pages on which images are formed, a method for selecting even pages of pages on which images are formed, and a method for selecting odd pages of pages on which images are formed;
- a second setting column which enables a target page with which an overlay image overlaps to be selected by one of a method for selecting even pages of pages on which images are formed, and a method for selecting odd pages of pages on which images are formed; and
- a third setting column which enables a target page with which an overlay image overlaps to be selected by designating arbitrary pages.

14. The method according to claim 8, further comprising synthesizing data for each page with the setting of an overlay image, corresponding to each page.

15. A non-transitory computer readable recording medium enabling a computer to perform processes comprising:
- displaying a setting screen which enables at least one overlay image overlapping with a page to be selected from a plurality of predetermined overlay images and which enables at least one target page with which a selected overlay image overlaps to be selected from a plurality of pages on which images are formed based on one of a plurality of selection methods, the plurality of selection methods include a method for selecting all pages on which images are formed and a method for designating arbitrary pages of pages on which images are formed;
- receiving an operation which a user inputs to the displayed setting screen;
- obtaining a selected image information indicating a selected overlay image in the setting screen based on the received operation input, target page information indicating a target page selected as a target with which the selected overlay image overlaps, and selection method information indicating a selection method used to select the target page; and
- confirming an overlay image which is set to overlap by the selection method with the highest priority order of the selection methods used to select a page, to an overlay image overlapping with the page when there is a page which is selected in an overlapping manner by the plurality of selection methods based on the information obtained by the information obtaining unit, setting the overlay image which is set to overlap by the method for designating arbitrary pages for the page which is selected in an overlapping manner by the method for selecting all pages and the method for designating arbitrary pages.

16. The non-transitory medium according to claim 15, wherein the page selection method used to select a smaller number of pages has a higher priority order.

17. The non-transitory medium according to claim 16, wherein the page selection method is one of a method for selecting all pages on which images are formed, a method for selecting even pages of pages on which images are formed, a method for selecting odd pages of pages on which images are formed, and a method for designating arbitrary pages of pages on which images are formed.

18. The non-transitory medium according to claim 17, wherein the priority order for the selection method for designating arbitrary pages is the highest.

19. The non-transitory medium according to claim 15, further comprising performing a display indicating a compatibility relationship between an overlay image selected based on the input to the setting screen and a page on which the selected overlay image is formed.

20. The non-transitory medium according to claim 15, wherein the setting screen includes:
- a first setting column which enables a target page with which an overlay image overlaps to be selected by one of a method for selecting all pages on which images are formed, a method for selecting even pages of pages on which images are formed, and a method for selecting odd pages of pages on which images are formed;
- a second setting column which enables a target page with which an overlay image overlaps to be selected by one of a method for selecting even pages of pages on which images are formed, and a method for selecting odd pages of pages on which images are formed; and
- a third setting column which enables a target page with which an overlay image overlaps to be selected by designating arbitrary pages.

* * * * *